(12) United States Patent
Goldman

(10) Patent No.: US 6,487,287 B1
(45) Date of Patent: Nov. 26, 2002

(54) DYNAMIC CONCENTRATION OF ANNOUNCEMENT CIRCUITS

(75) Inventor: Stuart O. Goldman, Scottsdale, AZ (US)

(73) Assignee: AG Communication Systems Corporation, Phoenix, AZ (US)

( * ) Notice: Subject to any disclaimer, the term of this patent is extended or adjusted under 35 U.S.C. 154(b) by 0 days.

(21) Appl. No.: 09/253,879

(22) Filed: Feb. 22, 1999

(51) Int. Cl.[7] .................. H04M 1/64; H04M 7/00; H04M 3/14

(52) U.S. Cl. .............. 379/230; 379/221.11; 379/88.25; 370/237; 370/236

(58) Field of Search .................. 379/221.11, 67.1, 379/84, 88.25, 93.07, 100.09, 207.05, 221.12, 221.09, 221.1, 211.02, 230; 370/236, 237, 400

(56) References Cited

U.S. PATENT DOCUMENTS 5,583,920 A * 12/1996 Wheeler, Jr. ............ 379/114.29
5,953,655 A * 9/1999 Oiwa ...................... 455/403

* cited by examiner

*Primary Examiner*—Fan Tsang
*Assistant Examiner*—Olisa Anwah
(74) *Attorney, Agent, or Firm*—David J. Zwick

(57) ABSTRACT

A system in which centralized announcement platforms are connected to host switches over dedicated trunks, and remote switches needing announcement services send a signaling message to a host switch requesting a connection to the announcement platform. A connection is then established between the host switch and the remote switch over a regular trunk, and the full connection is completed over a dedicated circuit between the host switch and the announcement platform. Announcement message ID and other information required by the announcement platform is coded in the available parameter fields of a signaling message. Less total circuits are required and redundancy is provided.

5 Claims, 3 Drawing Sheets

DYNAMIC CONCENTRATION OF ANNOUNCEMENT CIRCUITS

FIELD OF THE INVENTION

The present invention relates to the field of telephony announcement systems, and more particularly to a system allowing a telephony announcement platform to be shared between telephony switches.

BACKGROUND OF THE INVENTION

The traditional approach to providing announcement functionality for a subscriber served by a central office switch is to equip an announcement platform co-located with the switch and connect the announcement platform to the switch with dedicated circuits. These announcement platforms provide information to callers, speaking announcements such as "You must first dial a one when calling this number" or "The number you have dialed has been changed. The new number is . . . " A telephone network comprising two switches, communicating with each other over regular trunks, and each switch having a co-located announcement platform is shown in FIG. 1. Telephone instruments connected to a switch typically only access the announcement platform associated with that switch. There are several problems associated with the traditional approach to providing announcement functionality. Increasing the announcement capacity to multiple announcement platforms in multiple switching offices can be very expensive. It is also possible that in a multi-vendor environment, the needed announcement platform equipment to increase the capacity may only be available from the original vendor. Similarly, upgrading announcement platform functionality for multiple switching offices can be very expensive. Also, announcement system message maintenance requires that maintenance be performed on each announcement platform. This can be time consuming and may require specific expertise about several different types of equipment in a multi-vendor environment. There is also an inherent risk of failing to synchronize all of the announcement platforms, resulting in different subscriber treatment depending on which platform serves the subscriber.

Accordingly, there is a need to reduce the number of announcement platforms in a network, thereby easing the burden of maintaining a multi-switch environment.

One solution to this problem is to provide centralized announcement platforms in the network each serving a number of switches over dedicated trunks. FIG. 2 shows such a network comprising four switches, communicating with each other over regular trunks, and two centralized announcement platform Each centralized announcement platform is shared by two of the switches over dedicated trunks. As in the non-centralized platform environment, telephone instruments connected to a switch typically can only access the announcement platform associated with that switch.

This solution eases the platform maintenance burden by reducing the number of announcement platforms in the network. However, there also is a need to reduce the total number of dedicated circuits serving announcement platforms, and a need to provide redundancy such that, for example, in the case of an announcement system all circuits busy condition, an alternate designated platform can provide announcement services to the calling party.

SUMMARY OF THE INVENTION

The present invention provides a system in which centralized announcement platforms are connected to "host" switches over dedicated trunks. A remote switch needing announcement services sends a signaling message to a host switch requesting a connection to the announcement platform. A connection is then established between the host switch and the remote switch over a regular trunk, and the full connection is completed over one of the dedicated circuits between the host switch and the announcement platform. Announcement message ID and other information required by the announcement platform is coded in the available parameter fields of a signaling message.

In the present invention, the trunks that were present in the prior art between a remote switch and the main distribution frame at the office of a co-located centralized announcement platform have been converted to regular trunks between the remote switch and the host switch, and the trunks, that were present in the prior art between the distribution frame and the centralized announcement platform have been converted to dedicated circuits between the host switch and the announcement platform. With this arrangement, an economy of scale is realized. In the present invention, both the total number of circuits required between the remote switches and the host switch office, and the number of announcement circuits on the centralized announcement platform are less in number than the respective values of the prior art centralized system.

The invention also provides for redundancy in the event that announcement circuits on the centralized announcement platform are unavailable. If a request for a connection to the announcement platform is rejected by the host switch, the remote switch can send another announcement platform connection request to another host switch.

DESCRIPTION THE PREFERRED EMBODIMENT

Figure 1:
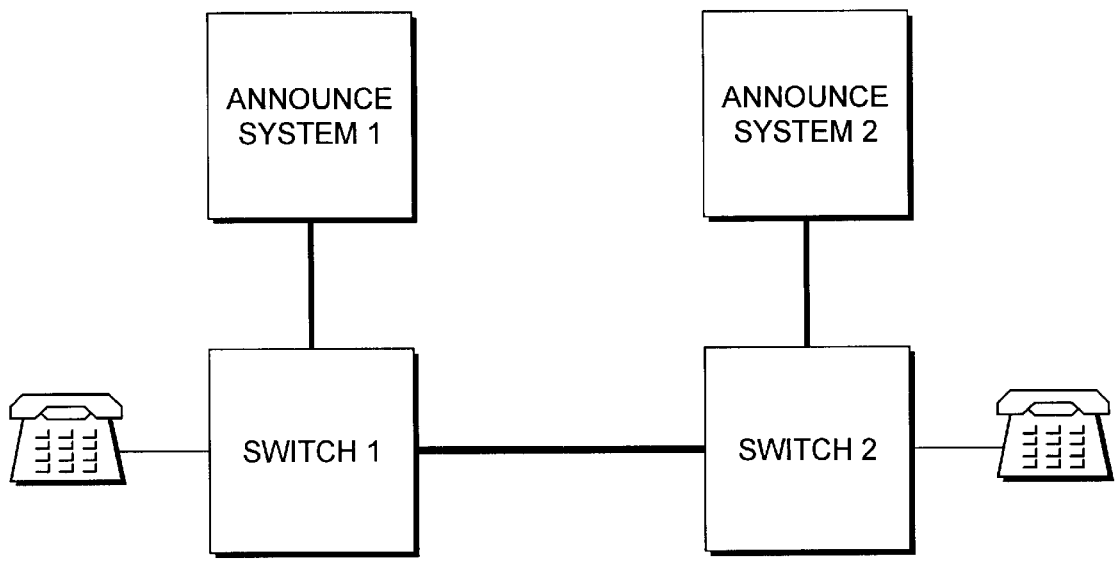
FIG. 1 shows a block diagram of a first prior art system.
Figure 2:
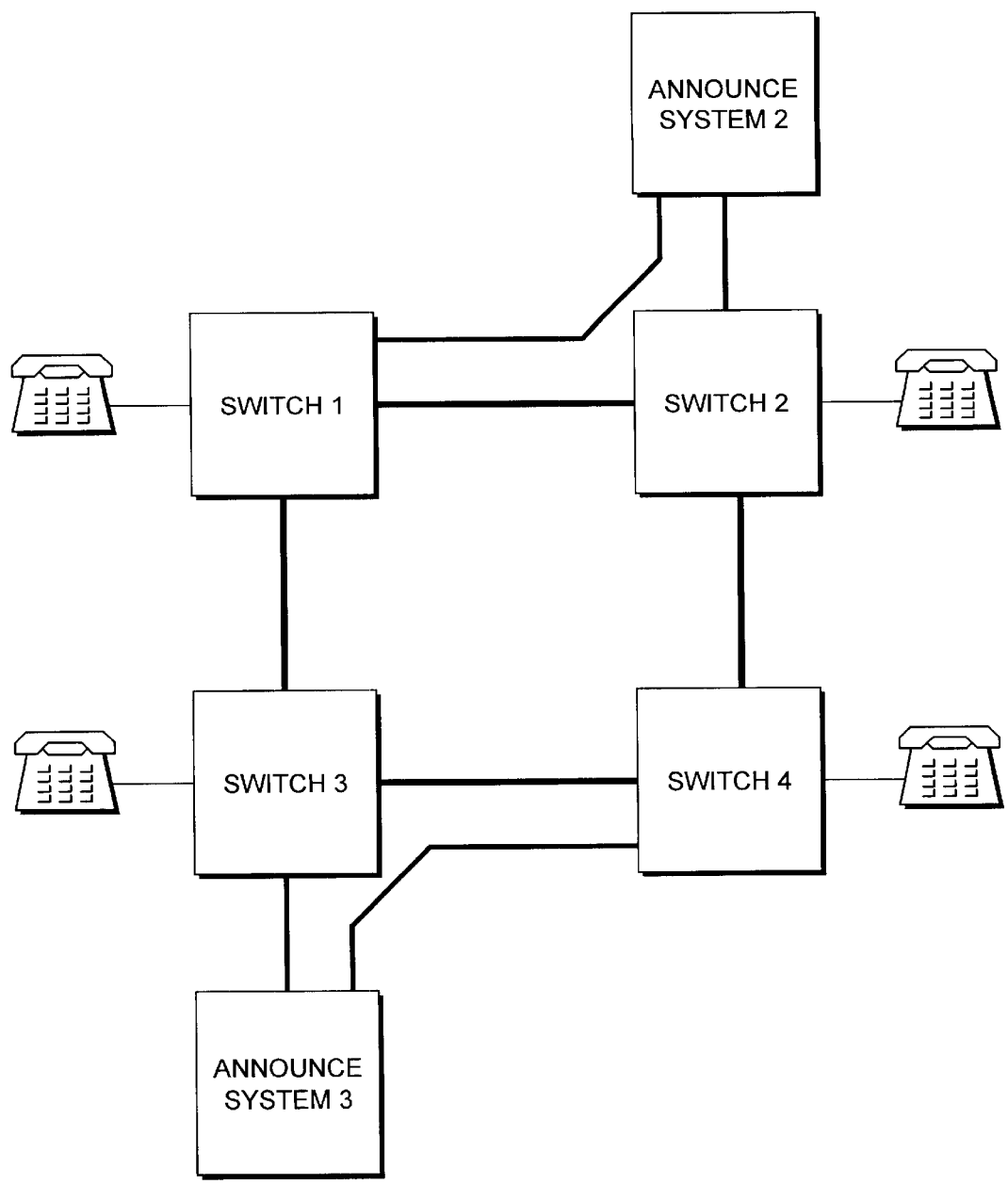
FIG. 2 shows a block diagram of a second prior art system.
Figure 3:
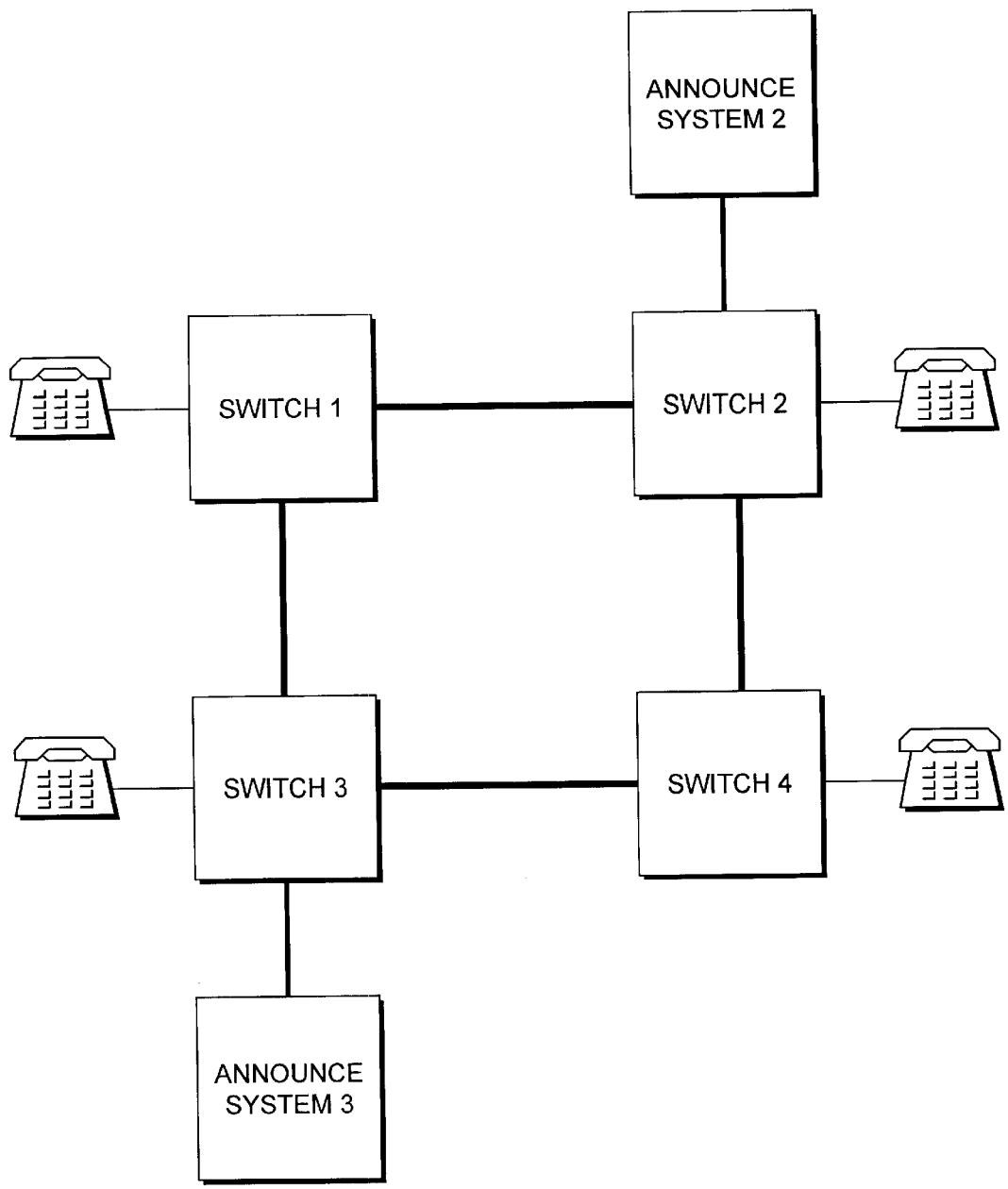
FIG. 3 shows a block diagram of a preferred embodiment of the telephony announcement system of the present invention.

FIG. 3 shows a block diagram of a preferred embodiment of the telephony announcement system of the present invention. The telephone network in which the present invention resides will support a suitable signaling protocol that includes information elements capable of carrying application specific information. In the preferred embodiment, the signaling protocol is Signalling System 7 (SS7), as described in standards publication ANSI T1.110-1992, "Signalling System No. 7 (SS7)—General Information," American National Standards Institute, 1992, and the other standards in this series, ANSI T1.111-1996, ANSI T1.112-1996, ANSI T1.113-1995, ANSI T1.114-1996, and ANSI T1.116-1996.

In general, switches embodying the invention must be capable of supporting the telephone signaling protocol and be able to provide different treatment to connection requests depending on information contained in protocol messages. In the preferred embodiment, Switches 1 through 4 are GTD-5® EAX digital telecommunications switches, manufactured by AG Communication Systems. GTD-5 is a registered trademark of GTE Corp.

Switches 1 through 4 are interconnected over regular trunks, which can comprise, for example, T1 trunks, channel banks, four-wire E&M, or two-wire connections. Although shown as direct connections for purposes of illustration, these connections typically include other network elements including signal transfer points, signal switching points, access tandems and other tandem switches, over various digital or analog transmission media including copper, fiber, and through-the-air.

Announcement Systems 2 and 3 can be any suitable commercially available telephone network announcement system, for example model McIAS 2100 Expanded Announcement System by Cognitronics, Inc. In general, specifying a suitable announcement system is a design decision based on factors such as functionality capacity and cost. Announcement System 2 and 3 are connected to Switches 2 and 3 over dedicated trunks. Switches with announcement platforms directly connected are hereinafter referred to as host switches. Switches not directly connected to announcement platforms are hereinafter referred to as remote switches.

In operation, one or more Public Dialing Plan, directory numbers (DNs) are used by host Switches 2 and 3 for connections to their associated Announcement Systems 2 and 3. Multiple announcement DNs can be used to address multiple announcement platforms connected to a host switch. Multiple announcement DNs can also be used for traffic measurements, where one or more remote switches are assigned to a given announcement DN.

At remote Switches 1 and 4, primary and alternate routing announcement DNs are assigned from the announcement DNs an host Systems 2 and 3. For example, remote Switch 1 may have host Switch 2 assigned for its primary routing announcement DN, and host Switch 3 assigned for its alternate routing announcement DN. The primary and alternate routing announcement DNs are assigned based on such-factors as network routing considerations and load balancing of Announcement Systems 2 and 3. In general the primary and alternate routing usage is dynamic, based on current network conditions.

When remote Switches 1 or 4 determine that an announcement is required to be played to a subscriber, the remote switch formulates an SS7 Initial Address Message (IAM) and sends it to the remote switch's primary announcement DN requesting a connection to the assigned DN associated with the primary announcement host switch. In the preferred embodiment, announcement system message ID information for, example specific announcements, specific parameters, and chains of subsequent announcements to be played, is coded into the IAM Generic Address Parameter (GAP). In general, any suitable field in any suitable signaling message can be used to transmit announcement system message ID information.

If an idle trunk from the primary announcement host switch to the announcement system is not available, the connection request will be released with a cause code of "busy." The remote switch requesting the connection could then issue an announcement system connection request to an alternate announcement system DN. Such alternate routing is well known in the art.

If the host switch has trunks available to the announcement system, a trunk is seized. The host switch then extracts the announcement system message ID information coded in the IAM GAP and passes this information in an announcement request to the announcement system in the format required by the announcement system interface, for example multi-frequency (MF).

Incorrect or incomplete announcement system message ID information in the IAM GAP will cause the host switch to reject the connection request.

In an alternate embodiment, announcement system message ID and other information required by the announcement system may be passed directly from the remote switch to the announcement system after a connection is established. In this embodiment, the signaling protocol is not required to pass application specific parameters in information elements of the protocol.

In the preferred embodiment, host systems recognize an announcement system connection request and initiate the special processing of the invention based on the presence of one of the reserved DNs in the Called DN field of the IAM. In general, the presence or absence of predetermined values in any suitable message field may be used to indicate that a connection to the announcement system is being requested.

An Address Complete Message (ACM), or more generally any other signaling message accomplishing this intent, is then sent back to the requesting remote switch completing the connection and indicating that the announcement system is ready to start playing the announcement. At this point, the subscriber hears the announcement being played at the host office. When the subscriber hangs up or the announcement system times-out, the circuit is released according to established SS7 protocol.

The preferred embodiment describe the usual situation where announcements are provided to the calling party by the originating office. However, in some cases the announcement is provided to the calling party by the terminating office serving the called party. For example, in the case of a called party with a Do Not Disturb feature activated, the terminating office would connect the calling party to an announcement platform and play a message such as "The party you have called does not wish to be disturbed. Please hang up and try again later." The announcement platform may be connected to a host switch remote to the terminating office. The invention of Applicant may be applied to advantage here, as well. This arrangement can be considered as a slight change to the configuration of the preferred embodiment, where the terminating switch serves as the remote switch of the preferred embodiment the switch remote to the terminating switch having the announcement platform connected thereto serves as the host switch of the preferred embodiment, and the calling party is viewed as the subscriber of the preferred embodiment and connected to the terminating switch through a path that includes intermediate network elements.

In an alternate embodiment, the invention of Applicant may be implemented on a host switch with subscribers connected thereto. When the host switch determines that an announcement is required to be played to a subscriber connected to the host switch, the host switch first attempts to connect the subscriber to the attached announcement platform over a dedicated circuit. This is a well known procedure for connecting a subscriber to an announcement platform. If the connection to the attached announcement platform is rejected, the switch then acts as a remote switch in accordance with the present invention, and attempts to connect the subscriber to an announcement platform attached to the switch's designated primary or alternative routing announcement services switches.

The invention of Applicant does not require any changes to network elements intermediate to the host and remote switches since all signaling associated with the invention uses standard messages of the network signaling protocol.

A primary benefit of the present invention is that less total circuits are required to provide announcement services. Based on Erlang B traffic analysis, which governs trunk engineering in a telephone network wherein calls are blocked when resources are not available, when the pools of dedicated trunks between a host switch and the served remote switch offices are converted to the pool of general trunks between the host and remote offices, the resulting pool of generate trunks requires less .total circuits than the sum of circuits in the separate pools for the same probability of circuit availability. The present invention may also take advantage of the concentration of general trunks that normally occurs as they pass through intermediate offices.

Similarly, when each pool of dedicated announcement circuits on the announcement system that serves a specific remote switch are converted to a single shared pool of circuits controlled by the host switch, the resulting pool of shared circuits requires less total circuits than the sum of circuits in the separate pools for the same probability of circuit availability.

While a preferred embodiment of an announcement system of the present invention has been particularly shown and described, it is not intended to be exhaustive nor to limit the invention to the embodiment disclosed. It will be apparent to these skilled in the art that modifications can be made to the present invention without departing from the scope and spirit thereof. It is intended that the scope of the invention be defined by the claims appended hereto and their equivalents.

What is claimed is:

1. A system for providing telephone announcements to subscribers of a telecommunications network supporting Signalling System 7 message traffic and having one or more announcement platforms and having one or more remote switches with one or more subscribers coupled to each remote switch, said system comprising:

a plurality of host switches in the network, each coupled to one of the announcement platforms over one or more dedicated trunks, and each coupled to the remote switches over one or more regular trunks of the network;

each of said host switches operable to receive Initial Address Message (IAM) messages transmitted from one or more of the remote switches indicating requests for connection between subscribers coupled to transmitting remote switches and the announcement platforms coupled to said host switches, said IAM messages having announcement message ID and other information required by the announcement platforms coded in the Generic Address parameter of said IAM messages;

each of said host switches further operable in response to said received IAM messages to establish connections between said host switches and their coupled announcement platforms in accordance with their coupled announcement platform procedures; and each of said host switches further operable in response to said received IAM messages to cooperate with the transmitting remote switches to establish connections to the transmitting remote switches, thereby completing connections between the announcement platforms coupled to said host switches and subscribers coupled to the transmitting remote switches.

2. A system for providing telephone announcements to subscribers of a telecommunications network supporting Signalling System 7 message traffic and having a plurality of host switches with each coupled to an announcement platform over one or more dedicated trunks, said system comprising:

one or more remote switches in the network, each coupled to one or more subscriber, and each coupled to the host switches over one or more regular trunks of the network;

each of said remote switches operable to formulate and transmit to the host switches Initial Address Message (IAM) messages indicating requests for connection between subscribers coupled to said remote switches and the announcement platforms coupled to the host switches, said IAM messages having announcement massage ID and other information required by the announcement platforms coded in the Generic Address Parameter of said IAM messages; and each of said remote switches further operable to cooperate with the host switches responding to said transmitted IAM messages to establish connections to the responding host switches, thereby completing connections between the subscribers coupled to said remote switches and the announcement platforms coupled to the responding host switches.

3. A method for providing telephone announcements to subscribers of a telecommunications network supporting Signalling System 7 message traffic, said method comprising the steps of:

transmitting an Initial Address Message (IAM) message from a remote switch to a host switch indicating a request for connection between a subscriber coupled to the remote switch and an announcement platform coupled over dedicated trunks to the host switch, said IAM message having announcement message ID and other information required by the announcement platform coded in the Generic Address Parameter of said IAM message;

establishing a connection between the host switch and the announcement platform in accordance with the procedures of the announcement platform; and establishing a connection between the host switch and the remote switch over regular trunks, thereby completing the requested connection between the subscriber and the announcement platform.

4. A system for providing telephone announcements to subscribers of a telecommunications network supporting Signalling System 7 message traffic and having a plurality of host switches with each coupled to an announcement platform over one or more dedicated trunks, said system comprising:

one or more remote switches in the network, each coupled to one or more subscribers, each coupled to the host switches over one or more regular trunks of the network, and each coupled to a local announcement platform over one or more dedicated trunks;

each of said remote switches operable to connect subscribers coupled to each of said remote switches to the announcement platforms coupled to each of said remote switches;

each of said remote switches operable, if a connection to a local announcement platform is rejected by the local announcement platform, to formulate and transmit to the host switches Initial Address Message (IAM) messages indicating requests for connection between subscribers coupled to said remote switches and the announcement platforms coupled to the host switches, said IAM message having announcement message ID and other information required by the announcement platforms coded in the Generic Address Parameter of said IAM messages; and each of said remote switches further operable to cooperate with the host switches responding to said transmitted IAM messages to establish connections to the responding host switches, thereby completing connections between the subscribers coupled to said remote switches and the announcement platforms coupled to the responding host switches.

5. A method for providing telephone announcements to subscribers of a telecommunications network supporting Signalling System 7 message traffic, said method comprising the steps of:

establishing a connection between a subscriber coupled to a remote switch and a local announcement platform coupled over dedicated trunks to the remote switch;

transmitting an Initial Address Message IAM message, if the connection between the subscriber and the local announcement platform is rejected by the local announcement platform, from the remote switch to a host switch indicating a request for connection between a subscriber coupled to the remote switch and an announcement platform coupled oven dedicated trunks to the host switch, said IAM message having announcement message ID and other information required by the announcement platform coded in the Generic Address Parameter of said IAM message;

establishing a connection between the host switch and the announcement platform in accordance with the procedures of the announcement platform; and establishing a connection between the host switch and the remote switch over regular trunks, thereby completing the requested connection between the subscriber and the announcement platform.

* * * * *